Jan. 22, 1952  G. BLATCHFORD  2,583,354
DOOR OPERATOR FOR DOGHOUSES
Filed July 28, 1949  2 SHEETS—SHEET 2
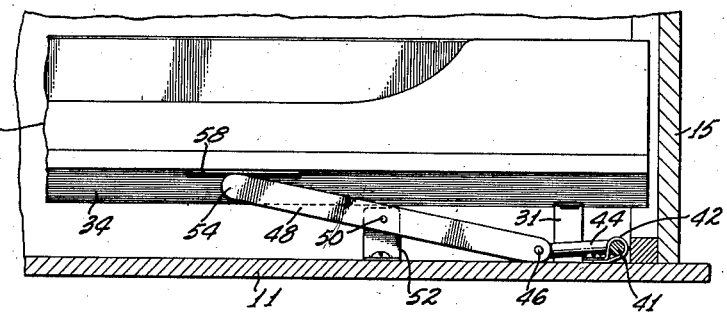
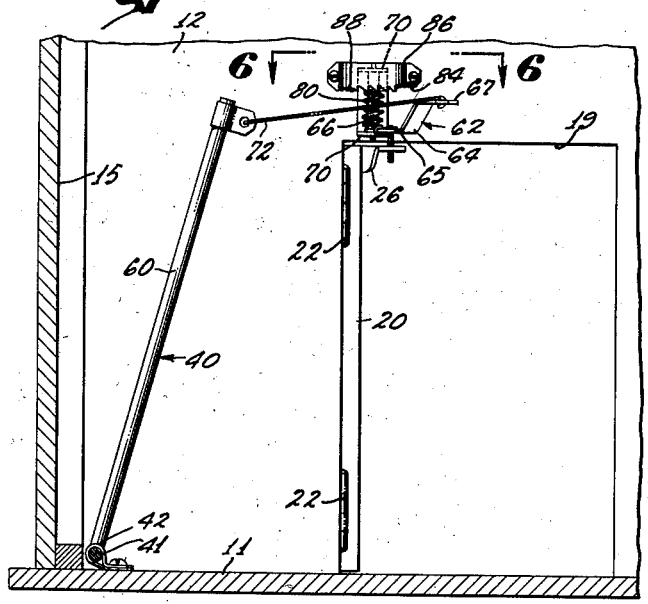
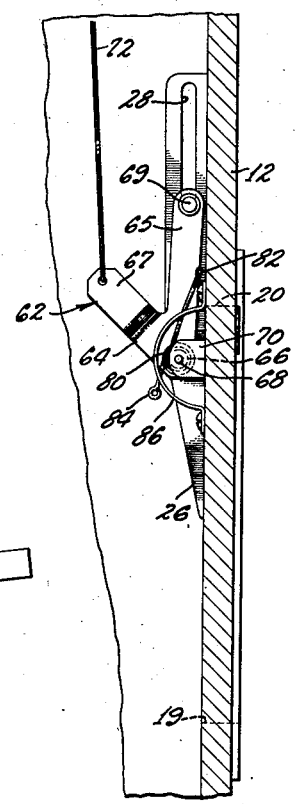
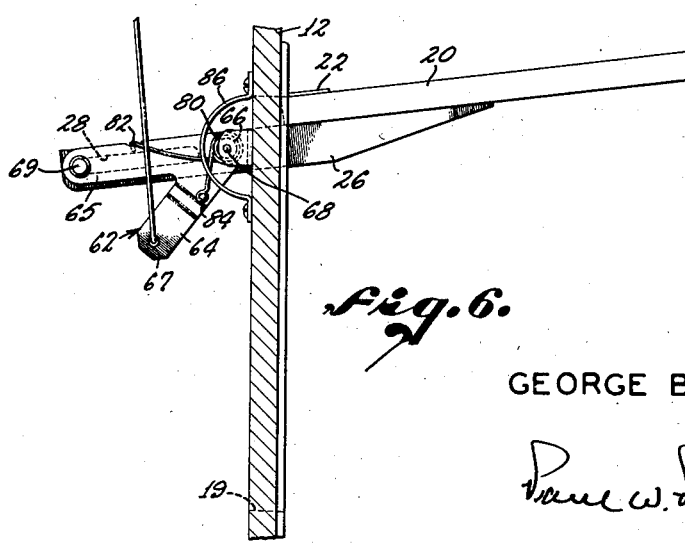
GEORGE BLATCHFORD
*INVENTOR*
ATTORNEY.

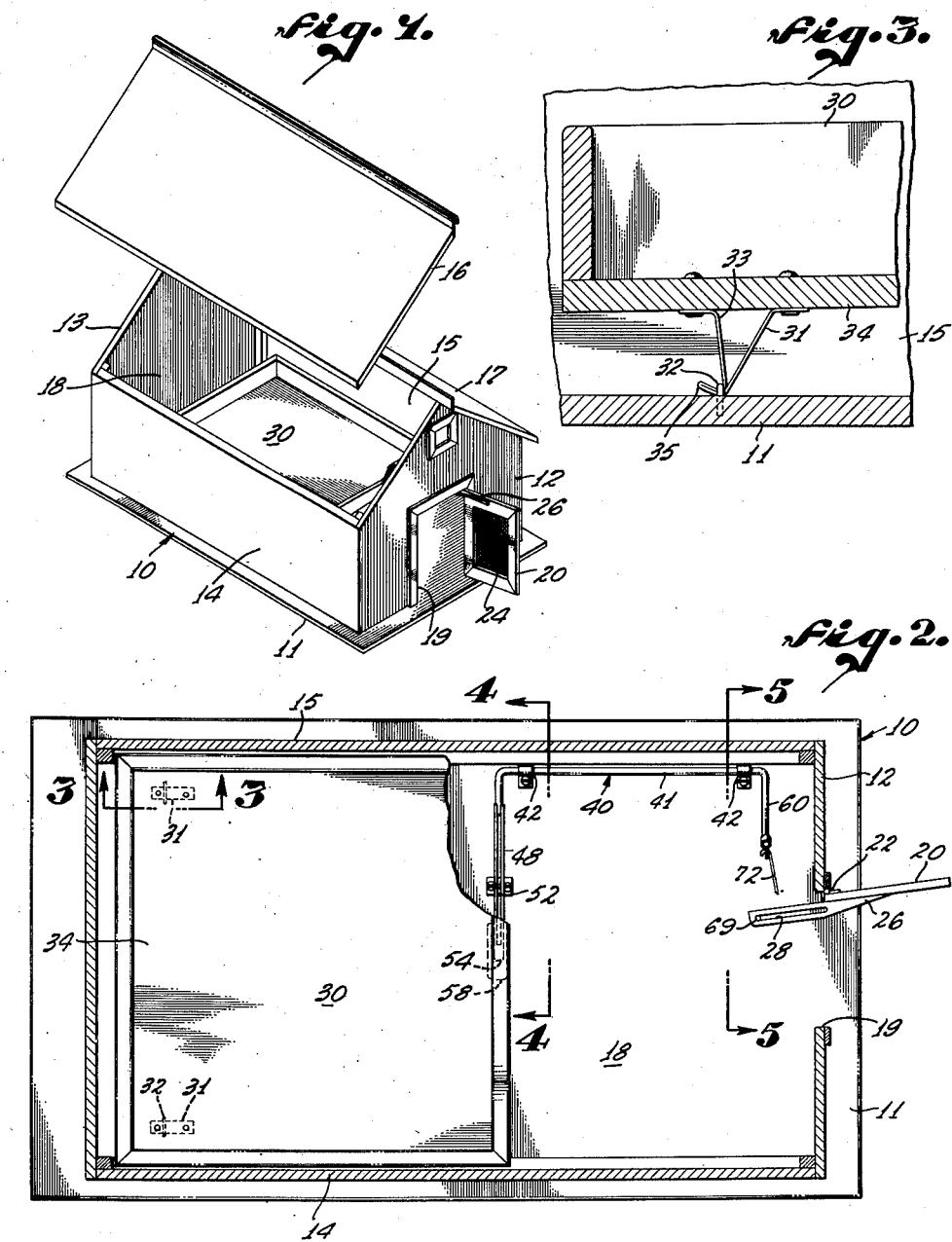

Patented Jan. 22, 1952

2,583,354

UNITED STATES PATENT OFFICE 2,583,354

DOOR OPERATOR FOR DOGHOUSES

George Blatchford, Los Angeles, Calif.

Application July 28, 1949, Serial No. 107,253

2 Claims. (Cl. 268—36)

This invention relates to a dog house and more particularly to an improved door-operating mechanism therefor.

The principal object of the invention is to provide an improved door-operating mechanism for a dog house which automatically closes the door when a dog occupies a bunk in the dog house and which automatically opens the door when the dog leaves the bunk.

Another object of the invention is to provide such a door-operating mechanism which may be adjusted to assure positive operation of the door.

Another object of this invention is to provide such a door-operating mechanism which is of simple inexpensive construction.

The foregoing and other objects of this invention will be more readily understood by reference to the accompanying drawings taken in connection with the ensuing detailed description wherein one embodiment of this invention is illustrated and described.

In the accompanying drawings:

Fig. 1 is a perspective view of a dog house empolying my improved door-operating mechanism;

Fig. 2 is a vertical sectional view of the dog house, parts of the device being omitted for the sake of clarity;

Fig. 3 is a fragmentary view of the bunk hinge;

Fig. 4 is a vertical sectional view of the door-operating mechanism taken on the line 4—4 of Fig. 2;

Fig. 5 is a vertical sectional view of the door-operating mechanism taken on the line 5—5 of Fig. 2;

Fig. 6 is a horizontal sectional view taken on the line 6—6 of Fig. 5, showing the door in open position; and Fig. 7 is a view similar to that of Fig. 6 showing the door in closed position.

Referring to the drawings and particularly to Figs. 1 and 2, there is illustrated a dog house 10 having a front door 20 and a bunk 30 which is connected therewith by means of my improved door-operating mechanism 40. This mechanism is so designed that when a dog occupies the bunk 30 the door 20 closes, and when the dog leaves the bunk 30 the door 20 opens.

The dog house 10 is of conventional design and comprises a floor member 11, a front wall member 12, a rear wall member 13, and right and left side wall members 14 and 15 and roof sections 16 and 17 which define a space or compartment 18 for housing a dog. A doorway 19 is arranged in the lower middle portion of the front wall member 12 in order to permit ingress of the dog to the compartment 18 and egress therefrom.

One of the roof sections 17 is permanently secured in place and the other roof section 16 is arranged to be readily removable so as to permit access to the compartment 18. Such access is desirable to permit cleaning the dog house and so that the door-operating mechanism may be adjusted and repaired if desired and also to permit the dog owner access to a dog that has locked himself within the dog house and stubbornly refuses to leave at his master's command.

The door 20 is pivotally supported on the front wall member 12 by means of a pair of double-leaf hinges 22. The hinges 22 are of a type which permits the door 20 to be opened outwardly by pivotal movement about a vertical axis at the left side of the doorway 19. In the dog house shown, the door 20 is formed in part by a screen 24 in order to facilitate ventilation. An arm 26 is firmly secured to the inner surface of the door 20. This arm 26 extends inwardly through the doorway 19 at all times and lies adjacent to the inner surface of the front wall member 12 when the door 20 is closed, as illustrated for example in Fig. 7. The arm 16 is provided with an elongated slot 28 parallel to its length, and forms part of the door-operating mechanism 40 as more fully explained hereinbelow.

The bunk 30 is of low, flat, square-box type construction. The bunk 30 is located in the rear portion of the dog house 10 and is pivotally supported on the floor 11 by means of a pair of hinges 31, 31. These hinges, as illustrated in detail in Fig. 3, are in the form of stationary staples 32 which are firmly secured in the upper surface of the floor 11 and movable brackets 33 which are firmly secured to the lower surface of the floor 34 of the bunk 30. Each of the brackets 33 is provided at its lowermost end with a foot 35 which extends rearwardly and slightly upwardly. The feet 35 are so shaped and proportioned and so spaced apart that they may be inserted in the staples 32 or removed therefrom so as to facilitate removal of the bunk 30 from the dog house for cleaning purposes and otherwise. The front end of the bunk is movable vertically about the axis of the two hinges 31, 31.

The door-operating mechanism 40 includes a shaft 41 that is rotatably supported in bearings formed by eyes 42 mounted upon the floor member 11 adjacent the left side wall member 15. A short crank 44 formed at the rear end of the shaft 41 extends sidewise toward the center of the dog house just beneath the front end of the bunk 30. The outer end of this crank is pivotally connected by means of a pin 46 to the left end of a lever 48 which is pivotally supported by means of a pin 50 at the upper end of a bracket 52 firmly secured to the floor member 11. The other end 54 of the lever 48 engages a wear-plate 58 firmly secured to the lower surface of the bunk floor 34 adjacent the front end thereof.

A long crank 60 formed at the front end of the shaft 41 extends upwardly therefrom and away from the adjacent side wall 15 toward the doorway 19. It is to be noted that if the door mechanism is operated so as to maintain the end 54 in contact with the wear-plate 58, then as the front end of the bunk 30 is raised, the upper end of the long crank 60 moves away from the adjacent side wall member 14 toward the doorway 19; and when the front end of the bunk is lowered, the upper end of the long crank 60 moves away from the doorway 19 toward the adjacent side wall member 14.

The door-operating mechanism 40 is completed by means of a linkage 62 which interconnects the upper end of the long arm 60 with the door arm 26. The linkage 62 comprises a bell crank 64 rigidly secured to a collar 66 that is rotatably mounted about a vertical shaft 68 firmly secured between a pair of vertically spaced brackets 70. The brackets 70 are firmly secured to the inner surface of the front wall member 12 and extend inwardly toward the center of the dog house at a position displaced vertically from the axis of the hinges 22 a short distance toward the center of the doorway 19.

The bell crank 64 is provided with horizontally extending arms 65 and 67 of unequal length. The lower arm 65 lies slightly above the door arm 26 and these two arms 65 and 26 are arranged to move in parallel planes. The longer arm 65 carries a downwardly projecting pin 69 which passes through and slidably engages the slot 28. The outer end of the shorter arm 67 is connected with the upper end of the long crank 60 by means of a straight link 72. It is to be noted that shorter bell crank arm 67 lies on that side of the longer bell crank arm 65 that is away from the long crank 60 when the door is open as shown in Fig. 6 and is away from the front wall member 12 when the door is closed as illustrated in Fig. 7.

A spring 80 is employed to urge the longer bell crank arm away from the front wall member 12 toward said doorway 19 so as to urge the door 20 into open position. At the same time the spring acts through the link 72, the long crank 60, the shaft 41, the short crank 44, and the lever 48 to urge the bunk into upward position. The spring 80 may be in the form of a coiled torsion spring which encircles the collar 66 and the shaft 68. The lower end 82 of the spring engages the longer bell crank arm 65 and the upper end 84 of the spring is attached to an anchor 86. The anchor 86 is in the form of an arcuate member arranged concentrically with the shaft 68 and fastened to the inner surface of the front wall member 12. The lower edge of this member is provided with serrations defining notches 88 which may be selectively engaged by the upper end 84 of the coil spring in order to adjust the strength of the spring. It is to be noted that the coil spring 80 is wound in such a direction that it produces a force on the bell crank 64 urging it away from the left side wall member 15 and the front wall member 12 toward the doorway 19.

In practice the strength of the spring 80 is selected or adjusted so that it produces sufficient force to maintain the door 20 open and the bunk 30 in its upper position when the bunk 30 is not occupied and so that when a dog using the dog house 10 occupies the bunk 30, the front end of the bunk 30 is pressed downwardly with sufficient force to overcome the strength of the spring and to close the door 20.

Although only one particular embodiment of this invention has been specifically illustrated and described, it will be obvious that the invention is not limited thereto but is capable of a variety of mechanical embodiments. Various changes that will now suggest themselves to those skilled in the art may be made in the form, details of construction, and arrangement of the elements without departing from the spirit of invention. Reference is therefore to be had to the appended claims for a definition of the limits of the invention.

I claim as my invention:

1. A device for opening and closing a doorway in a wall member by means of a door swingingly supported on said member and in response to tilting movement of a tiltably supported shelf, comprising: a shaft rotatably supported and extending in a direction away from said wall member; a first crank extending upwardly from said shaft from the end thereof adjacent said wall member; a second crank at the opposite end of said shaft; means connecting said second crank with a movable portion of said shelf for rotating said shaft to move said first crank toward said doorway when said movable portion is raised and away from said doorway when said movable portion is lowered; a horizontally disposed door arm mounted on the upper portion of said door and extending into the space between said doorway and said shelf, said door arm having a longitudinally arranged slot; a bell crank mounted on said wall member for rotation on a vertical axis, said bell crank having two horizontally extending arms angularly disposed and of unequal length, the longer bell crank arm lying above and adjacent said door arm and carrying a pin slidably engaging the slot in said door arm; a link connecting the upper end of said first crank with the outer end of said shorter bell crank arm, and a spring operatively connected with said bell crank to urge said longer bell crank arm and said door arm away from said wall member, thereby urging said door into its open position when said shelf tilts upwardly.

2. A device as described in claim 1, in which said bell crank is mounted on a vertical shaft and said spring is a coil spring encircling said shaft, and further including an arcuate member supported from said wall member and concentric with said shaft, said arcuate member being provided with a plurality of notches arranged to be selectively engaged by one end of said spring, the other end of said spring being connected with said bell crank.

GEORGE BLATCHFORD.

REFERENCES CITED

The following references are of record in the file of this patent:

UNITED STATES PATENTS

| Number | Name | Date |
|---|---|---|
| 572,299 | Hicks | Dec. 1, 1896 |
| 837,937 | Legg | Dec. 11, 1906 |
| 1,724,011 | Flagg | Aug. 13, 1929 |
| 2,009,758 | Blatchford | July 30, 1935 |
| 2,220,766 | Hubbs | Nov. 5, 1940 |